(12) United States Patent
DuPuis

(10) Patent No.: US 7,334,467 B1
(45) Date of Patent: Feb. 26, 2008

(54) AIR DATA MODULE THAT ENSURES SUFFICIENT AIR DATA PERFORMANCE AFTER EXPOSURE TO RELATIVELY HIGH OVERPRESSURE

(75) Inventor: Paul B. DuPuis, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/508,620

(22) Filed: Aug. 22, 2006

(51) Int. Cl.
*G01P 13/02* (2006.01)
(52) U.S. Cl. .................. 73/170.02; 73/180
(58) Field of Classification Search ......... 73/170.02, 73/180
See application file for complete search history.

(56) References Cited

U.S. PATENT DOCUMENTS

| | | | |
|---|---|---|---|
| 4,096,744 A | 6/1978 | De Leo et al. | |
| 4,350,314 A * | 9/1982 | Hoadley | 244/1 R |
| 4,378,696 A * | 4/1983 | DeLeo et al. | 73/180 |
| 4,549,706 A | 10/1985 | Stickney | |
| 4,909,077 A * | 3/1990 | Greene | 73/180 |
| 5,295,169 A * | 3/1994 | Tominaga et al. | 376/293 |
| 6,305,218 B1 | 10/2001 | Foster | |
| 6,550,344 B2 | 4/2003 | Bachinski et al. | |
| 6,892,584 B2 | 5/2005 | Gilkison et al. | |
| 6,915,687 B2 | 7/2005 | Foster et al. | |
| 6,940,425 B2 * | 9/2005 | Frantz | 340/963 |

* cited by examiner

*Primary Examiner*—Andre J. Allen
(74) *Attorney, Agent, or Firm*—Ingrassia Fisher & Lorenz

(57) ABSTRACT

An air data module is provided that is relatively small, lightweight, low cost, uses relatively low power, and is relatively easy to install, test, and maintain. The air data module includes a housing that is adapted to be mounted to an external surface of an aircraft, and includes at least a sensor compartment and an interface electronics compartment formed therein. A pitot-static probe is coupled to the housing and extends therefrom, and has a static pressure passageway that is in fluid communication with the sensor compartment. A plurality of static pressure ports are formed in the pitot-static probe and are in fluid communication with the static pressure passageway. A pitot pressure inlet port is formed in a distal end of the pitot-static probe. A static pressure sensor and a differential impact or absolute pitot pressure sensor, for example, may be mounted within the module and used to sense static pressure and impact or pitot pressure, respectively. The disclosed configuration makes the module less sensitive to a relatively high pressure pulse.

23 Claims, 7 Drawing Sheets

AIR DATA MODULE THAT ENSURES SUFFICIENT AIR DATA PERFORMANCE AFTER EXPOSURE TO RELATIVELY HIGH OVERPRESSURE

TECHNICAL FIELD

The present invention generally relates to aircraft pressure measurement and, more particularly, to an air data module that can be mounted external to an aircraft and that is configured to allow sufficient air data performance after exposure to a relatively high overpressure pulse.

BACKGROUND

Many aircraft, including general aviation aircraft, unmanned air vehicles (UAVs), missiles, and experimental and research aircraft, use various air data sensors and signal processing circuits to determine various flight-related parameters. For example, many aircraft include a plurality of pressure sensors to sense at least static pressure ($P_s$) and total ($P_t$) or impact pressure ($Q_c$) during aircraft flight. The signal processing circuits, based on pressure signals supplied from the pressure sensors, determine and supply signals representative of various flight-related parameters. Such parameters may include, for example, the just-mentioned pitot or impact pressure and static pressure, as well as Mach (M), calibrated airspeed (CAS), and barometric altitude, just to name a few. In some applications, sensors and associated processing circuitry have been packaged together into what may be referred to as an air data module (ADM).

The above-mentioned flight-related data are typically derived, either directly or indirectly, from two absolute pressure measurements. These pressure measurements include static pressure (Ps) and total pressure (Pt). As is generally known, static pressure is the ambient air pressure at the present vehicle altitude, and total pressure is the sum of the static pressure and the impact pressure (Qc) due to vehicle forward velocity (e.g., Pt=Ps+Qc). For some applications, the air data pressure sensors that are used to measure static and total pressure may be subject to short, relatively high magnitude pressure pulses. For example, many missiles are stored in containers that have protective covers. These protective covers are, in many instances, blown off during missile launch sequence by, for example, various types of pyrotechnic devices. As a result, the air data pressure sensors may be exposed to a significant, and potentially damaging, pressure pulse during the missile launch sequence. This pressure pulse can be significantly higher than the operating pressure of the air data pressure sensors during flight.

The accuracy of an air data system is primarily a function of the full-scale pressure range of the associated air data pressure sensors. Pressure sensor accuracy is typically stated as a percentage of full-scale range (e.g., % f.s.r.). For example, if the full-scale pressure range of a pressure sensor is 30 p.s.i., with a specified accuracy of ±0.05% f.s.r., then the accuracy would be ±0.015 p.s.i. Thus, if an air data pressure sensor will likely be exposed to the above-mentioned overpressure condition, the air data pressure sensor should, and typically is, designed to withstand this condition, with a safety factor because the resulting pressures may be loosely controlled. As a result, air data sensors designed for a significantly higher absolute pressure range than what is needed inflight may be used to adequately withstand the overpressure condition during launch. This in turn may dictate that the air data pressure sensors have a correspondingly tighter accuracy, as a percentage of full-scale range, to achieve the desired air data measurement performance. This can significantly increase air data sensor cost, which can concomitantly increase overall air data system and aircraft costs.

In addition to the above, many unmanned air vehicles (UAVs) typically have potentially limiting size, weight, power, and cost budgets associated with the air data system. Yet, the aircraft may simultaneously have relatively stringent requirements for accuracy, wide bandwidth, and low measurement latency over a relatively wide AOA range. Moreover, there is a generally a desire that the air data system be relatively easy to install, test, and maintain.

Hence, there is a need for an air data system that is relatively small, lightweight, low cost, uses relatively low power, and is relatively easy to install, test, and maintain. There is additionally a need for an air data module and method that relatively inexpensively provides sufficient accuracy and air data measurement performance following exposure to a relatively high overpressure condition. The present invention addresses one or more of these needs.

BRIEF SUMMARY

An air data module is provided that is relatively small, lightweight, low cost, uses relatively low power, and is relatively easy to install, test, and maintain. In one embodiment, and by way of example only, the air data module includes a housing, a pitot-static probe, a plurality of static pressure ports, and a pitot pressure inlet port. The housing is adapted to be mounted to an external surface of an aircraft, and includes at least a sensor compartment and an interface electronics compartment formed therein. The sensor compartment is isolated from the interface electronics compartment. The pitot-static probe is coupled to the housing and extends therefrom, and has at least an inner surface, an outer surface, and a distal end spaced apart from the housing. The inner surface defines a static pressure passageway that is in fluid communication with the sensor compartment. The plurality of static pressure ports extend between the pitot-static probe inner and outer surfaces, and each is in fluid communication with the static pressure passageway. The pitot pressure inlet port is formed in the pitot-static probe distal end.

In another exemplary embodiment, an air data module is provided that relatively inexpensively provides sufficient accuracy and air data measurement performance following exposure to a relatively high overpressure condition. The air data module includes a housing, a pitot-static probe, a plurality of static pressure ports, a pitot pressure inlet, an absolute pressure sensor, and a differential pressure sensor. The housing is adapted to be mounted to an external surface of an aircraft, and includes at least a sensor compartment and an interface electronics compartment formed therein. The sensor compartment is isolated from the interface electronics compartment. The pitot-static probe is coupled to the housing and extends therefrom, and has at least an inner surface, an outer surface, and a distal end spaced apart from the housing. The inner surface defines a static pressure passageway that is in fluid communication with the sensor compartment. The plurality of static pressure ports extend between the pitot-static probe inner and outer surfaces, and each is in fluid communication with the static pressure passageway. The pitot pressure inlet port is formed in the pitot-static probe distal end. The absolute pressure sensor is mounted within, and is in fluid communication with, the housing sensor compartment, and is configured to sense static pressure therein. The differential pressure sensor is in fluid communication with the static pressure passageway and the pitot pressure inlet port, and is configured to sense a differential pressure there-between.

In yet another exemplary embodiment, a method of providing air data sensor performance from pressure sensors used with an aircraft having a predetermined flight profile, and following exposure of the sensors to a predetermined overpressure magnitude, includes the steps of using an absolute pressure sensor to sense static pressure at a position on the aircraft, using a differential pressure sensor to sense impact pressure at the position on the aircraft, and determining one or more air data parameters based at least in part on the sensed static pressure and the sensed impact pressure. The absolute pressure sensor is designed for a full scale pressure range that is based on the predetermined overpressure magnitude, and the differential pressure sensor is designed for a full scale pressure range that is based on the predetermined flight profile of the aircraft and is not based on the predetermined overpressure magnitude.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although the integrated air data module is described as being mounted on an external surface of a missile, it will be appreciated that it could also be mounted on any one of numerous other aircraft and/or on any one of numerous other aircraft surfaces.

Figure 1:
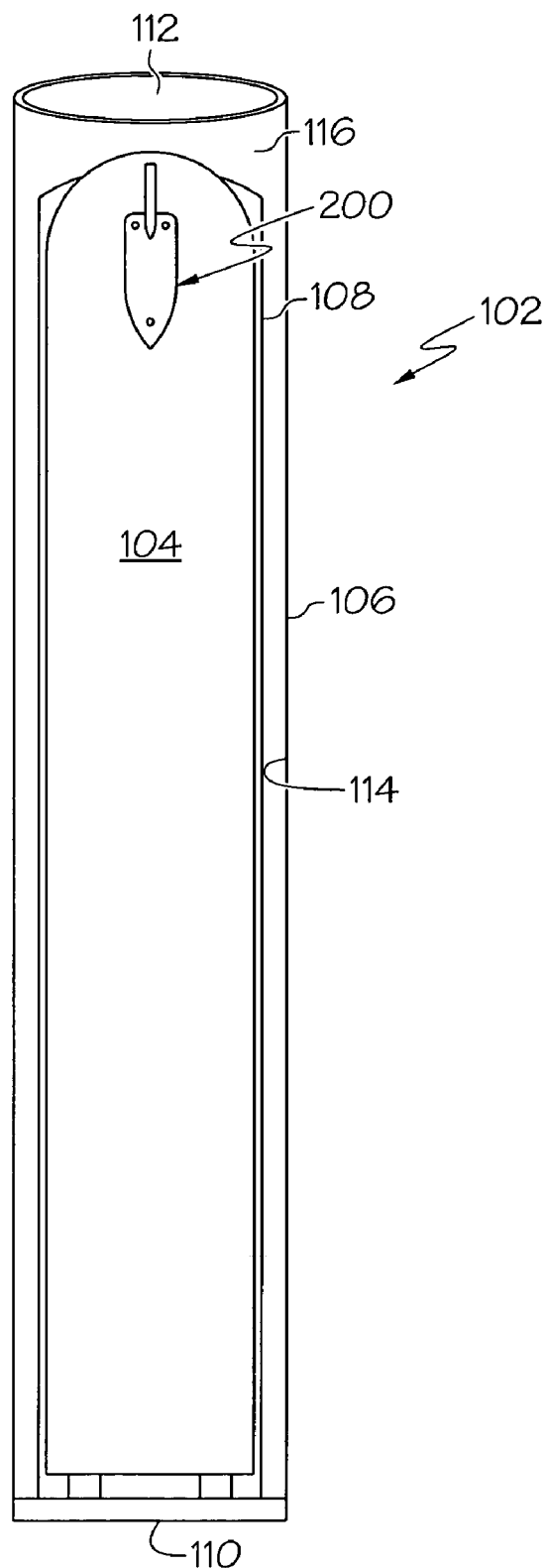
FIG. 1 is a simplified cutaway view of a storage canister having a missile stored therein.

Turning now to FIG. 1, a simplified partial cutaway view of a container 102 is depicted with an exemplary aircraft, such as a missile 104, disposed therein for storage. In the depicted embodiment, the container 102 is a combined container and launch unit (CLU) that serves as both a shipping/storage container, and a launch container for the missile 104. In this regard, the container 102 includes a generally cylindrical storage/launch container body 106, support/launch slides 108, a base end cover 110, and a top cover 112. The storage/launch container body 106 includes an inner surface 114 that defines a storage volume 116 within which the missile 104 and support/launch slides 108 are disposed. The support/launch slides 108 are spaced apart from the main body inner surface 114.

The base end cover 110 and top cover 112 seal the container inner volume 116. The top cover 112 is removed using one or more non-illustrated pyrotechnic devices as part of the missile launch sequence. After the top cover 112 is removed, the missile 104 exits the container 102 and begins heading toward its commanded target.

Figure 2:
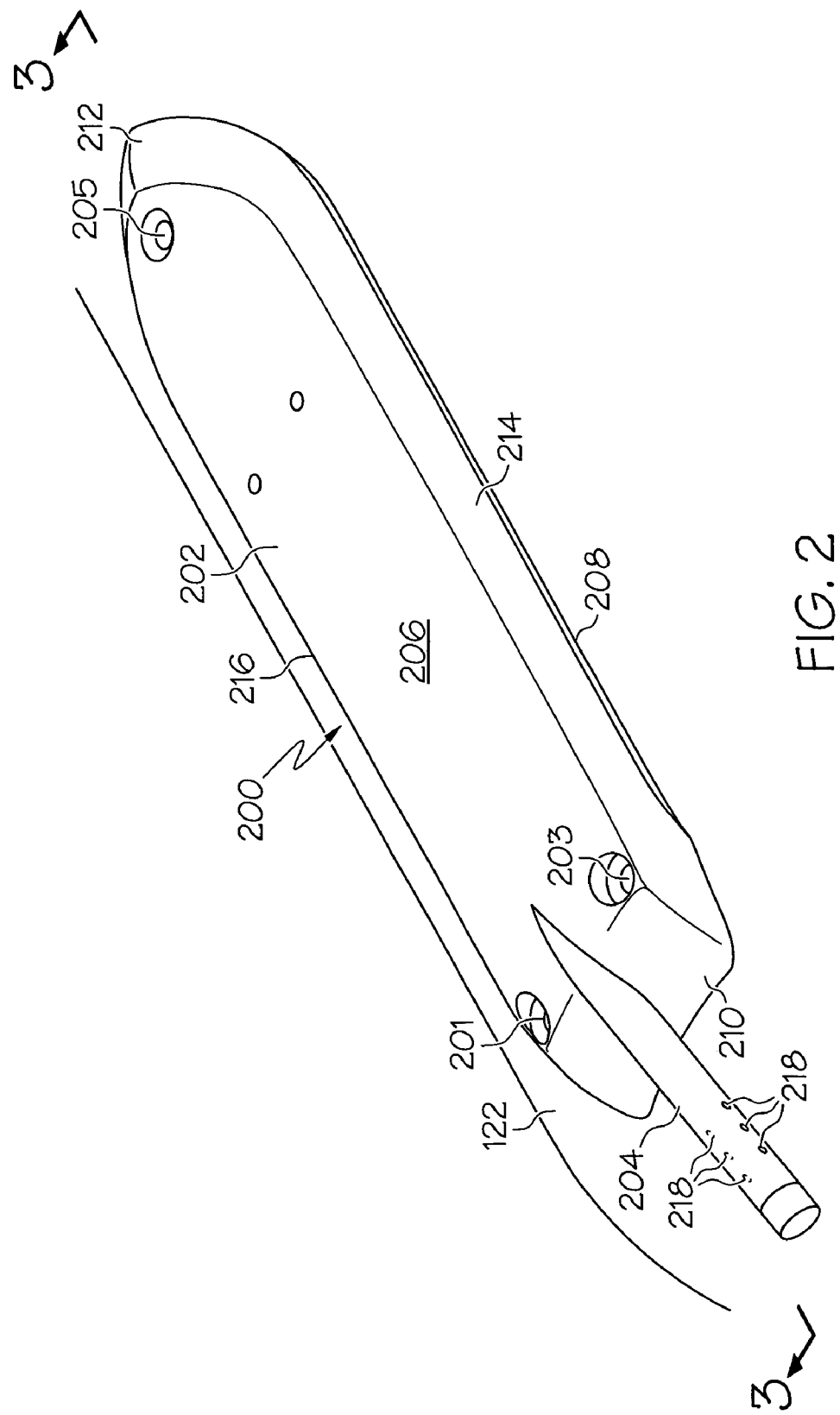
FIG. 2 is a perspective view of an exemplary integrated air data module, according to an embodiment of the present invention, shown externally mounted on the missile depicted in FIG. 1.

It will be appreciated that the flight path of the missile 104 is controlled based, at least in part, on flight-related data that are sensed and processed by an air data module 200. The air data module 200, which will be described in more detail further below, includes a plurality of pressure sensors that sense various pressures external to the missile 104. Thus, as was previously mentioned, when the pyrotechnic devices are ignited, the container inner volume 116, and thus each of the air data module pressure sensors, is exposed to a relatively large pressure pulse. This pressure pulse, as was also previously mentioned, can be of a magnitude that is significantly higher than the operating pressures the air data module pressure sensors experience during flight. To help alleviate this concern as well as others, a uniquely configured air data module is mounted on an external surface 122 of the missile 102. An exemplary preferred embodiment of the air data module 200 is depicted in FIGS. 2-4, and with reference thereto will now be described.

The air data module 200 includes a housing 202 and a pitot-static pressure probe 204. The housing 200, as noted above and as shown in FIGS. 2-4, is mounted on the external surface 122 of the missile and includes a top surface 206, a bottom surface 208, an upstream end 210, a downstream end 212, and first and second sides 214, 216. The housing bottom surface 208, or at least a portion thereof, as shown most clearly in FIG. 4, is preferably contoured to the external surface 122 on which the air data module 200 is mounted. In this case, the external surface 122 is that of the missile 102. It will be appreciated, however, that it could be contoured, as needed or desired, to mount on various other aircraft external surfaces. The housing 202 is preferably substantially smooth, and is constructed, at least partially, of a molded polymer, a cast metal, or combination of materials, and, if constructed of a polymer, is preferably coated, or at least partially coated, with an electromagnetic shielding material. The housing 202 is configured such that the upstream and downstream ends 210, 212 and the first and second sides 214, 216 are preferably tapered to serve as an integral fairing. This configuration promotes smooth, laminar airflow over the housing 202, and most notably at the upstream end 210 where the airflow splits and passes over the pitot-static pressure probe 204. It is noted that the downstream end 216 is preferably tapered in two dimensions to maintain laminar flow.

In the depicted embodiment, the air data module 200 is mounted on a top surface of the missile 104. This is done to minimize interference of the pitot-static probe 204, the configuration of which is discussed in more detail further below, with non-illustrated sensors that may be installed on the front of the missile 104. It will be appreciated, however, that the air data module could instead be mounted on a bottom surface or one of the side surfaces. However, as will also be discussed in more detail below, the angle at which the pitot-static probe 204 extends from the housing 202 would be accordingly adjusted. Moreover, if a level of redundancy is needed or desired, multiple air data modules 200 could be mounted on one or more of the aircraft external surfaces. No matter the number or specific location on the aircraft 104, the air data module 200 is preferably coupled to the external surface 122 via a plurality of fasteners. Although the number and location of the fasteners may vary, in the depicted embodiment three fasteners are used and extend through three fastener openings in the housing 202. Two of the fastener openings 201, 203 are positioned near the upstream end 214, and one of the fastener openings 205 is positioned near the downstream end 216. The fasteners near the upstream end 214 straddle the pitot-static probe 204 and firmly attach and seal it to the missile 104 to prevent water and contaminants from flowing between the housing 202 and the aircraft external surface 122.

Figure 3:
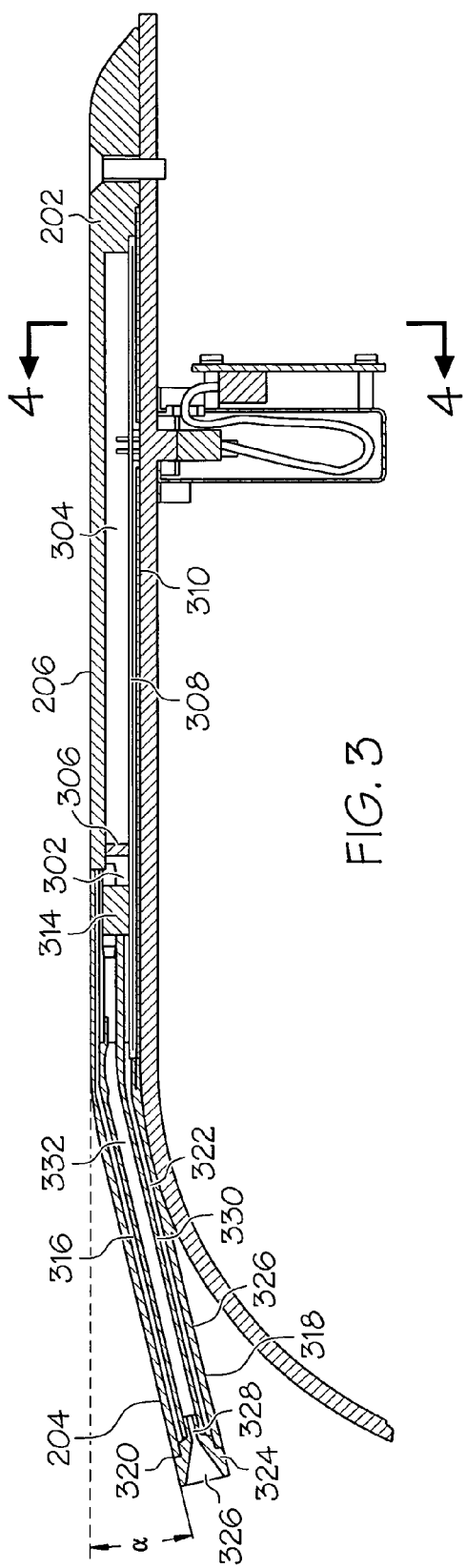
FIG. 3 is a cross section view of the integrated air data module take along line 3-3 in FIG. 2.
Figure 4:
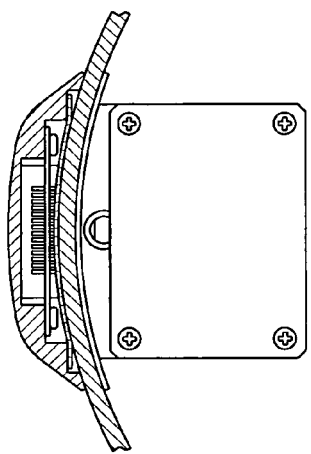
FIG. 4 is a cross section view of the integrated air data module take along line 4-4 in FIG. 2.

As is shown more clearly in FIG. 3, two compartments are formed in the housing 202—a sensor compartment 302 and an interface electronics compartment 304. When the air data module 200 is assembled, the sensor compartment 302 and interface electronics compartment 304 are isolated from each other via an integral wall 306 and a circuit board 308 that extends between the two compartments 302, 304. The circuit board 308 is preferably coupled to the housing 202 in a removable manner via, for example, a plurality of non-illustrated fasteners. A removable access cover 310 helps seal the back side of the circuit board 308 to provide a substantially fluid-tight seal for mechanical and environmental protection of the circuit board 308 and components mounted thereon. The circuit board 308 is sealed to the perimeter of both the sensor compartment 302 and interface electronics compartment 304. A pair of pressure sensors 312, 314 (only one visible in FIG. 3) are mounted on the circuit board 308 and disposed within the sensor compartment 302. As will be described in more detail further below, one of the pressure sensors 312 is preferably an absolute pressure sensor and the other pressure sensor 314 is preferably a differential pressure sensor. Because the sensor compartment 302 is sealed, only a single pressure connection is needed—that being the one to the differential pressure sensor 314, which is described further below.

The interface electronics compartment 304 houses an input/output (I/O) connector 315. The I/O connector 315 is coupled to the circuit board 308, extends through the access cover 310, and penetrates the aircraft surface 122. The I/O connector 315, which may be implemented using any one of numerous types of devices, electrically couples the air data module 200 to an appropriate I/O interface 317, such as, for example, an EIA-485, LVDS, or IEEE 1394b interface, that is disposed within the aircraft 104, and which communicates flight-related parameters to one or more circuits or devices within the missile 104.

With continued reference now to both FIGS. 2 and 3, it is seen that the pitot-static probe 204 is coupled to the housing 202, preferably at least proximate the housing upstream end 210, and extends therefrom. Preferably, the pitot-static probe 204 is integrally formed with the housing 202; however, it will be appreciated that it could be formed separate from the housing 202 and then coupled thereto. In either case, and as shown most clearly in FIG. 3, the pitot-static probe 204 includes an inner surface 316, an outer surface 318, and a distal end 320 that is spaced apart from the housing upstream end 210. The inner surface 316 defines a static pressure flow passage 322 that is in fluid communication with the sensor compartment 302, and as shown most clearly in FIG. 2, a plurality of static pressure ports 218 extend the pitot-static probe inner and outer surfaces 316, 318 and fluidly communicate the surrounding ambient pressure environment to the static pressure flow passage 322. In the depicted embodiment, in which the air data module 200 is mounted on a top surface of the missile 104, the static pressure ports 218 are disposed on the right (starboard) and left (port) sides of the pitot-static probe 204. Similarly, if the air data module 200 is mounted on a bottom surface of the aircraft 104, the static pressure ports 218 would also be disposed on the starboard and port sides of the pitot-static probe 204. This arrangement provides aerodynamic cancellation of angle of slip (AOS) effects on static pressure measurements. Conversely, if the air data module 200 is mounted on a side surface of the aircraft 104, the static pressure ports 218 would be disposed on the top and bottom sides of the pitot-static probe 204 to cancel AOA effects.

Returning once again to FIG. 3, the pitot-static probe distal end 320 includes a pitot pressure inlet port 324. In the depicted embodiment, the pitot pressure inlet port 324 is formed as a separate piece that is inserted into, or otherwise coupled to, the pitot-static probe distal end 320. It will be appreciated, however, that the pitot pressure inlet port 324 could alternatively be formed as an integral part of the pitot-static probe 204. In either case, however, the pitot pressure inlet port 324 is preferably configured such that it converges from a first cross sectional flow area at its inlet 326 to a second cross sectional flow area at its outlet 328. Moreover, a pitot pressure conduit 330, which is disposed within, and surrounded by, the static pressure flow passage 322, has a fluid passageway 332 formed therein that fluidly communicates the pitot pressure inlet port 324 with the sensor compartment 302. More specifically, the pitot pressure conduit fluid passageway 332 fluidly communicates the pitot pressure inlet port 324 with the differential pressure sensor 314 disposed within the sensor compartment 302. The pitot pressure conduit 330 is preferably implemented using a flexible, or at least substantially flexible, tube. It will be appreciated, however, that it could alternatively be formed of a rigid, or substantially rigid, tube. It will additionally be appreciated that in an alternative embodiment, the differential pressure sensor 314 is integrated into the pitot pressure inlet port 324, in which case the pitot pressure conduit 330 is not needed, and the communication is via a wire or an optic fiber. Moreover, in some applications an absolute pressure sensor may also be used in lieu of the differential pressure sensor 314.

The pitot-static probe 204, in addition to being formed with, or including, the above described features, extends from the housing 202 at a predetermined angle. In particular, and with continued reference in FIG. 3, it is noted that in the depicted embodiment the housing 202 is configured with a substantially flat top surface 206, and the pitot-static probe 204 extends from the housing 202 at a predetermined angle ($\alpha$) relative to the top (or outer) surface 206, and in a direction toward the surface 122 on which the air data module 200 is mounted. It will be appreciated that in alternative embodiments, in which the air data module 200 is configured to be mounted on a bottom surface of the aircraft 104, the pitot-static probe 204 would extend from the housing at the predetermined angle ($\alpha$), but in a direction away from the surface. It will be further appreciated that in other embodiments, in which the housing top (or outer) surface 206 may not be flat, the predetermined angle ($\alpha$) may be thought of as being formed relative to a plane that extends parallel to the surface 122 on which the housing 202 is mounted. The predetermined angle ($\alpha$) may vary, but is preferably selected based on the angle of attack (AOA) range over which the missile 104 or other aircraft is expected to fly. More specifically, the predetermined angle ($\alpha$) is set equal to, or at least substantially equal to, the mean of the expected AOA range or the median of the expected AOA range. This angling of the pitot-static probe 204 significantly reduces static pressure measurement sensitivity to AOA, which is sufficiently accurate over a ±10-degree AOA range around the zero axis of the pitot-static probe. It will be appreciated that appreciable deviations from the nominal AOA range are typically only transitory, and thus do not present a significant concern.

Figure 5:
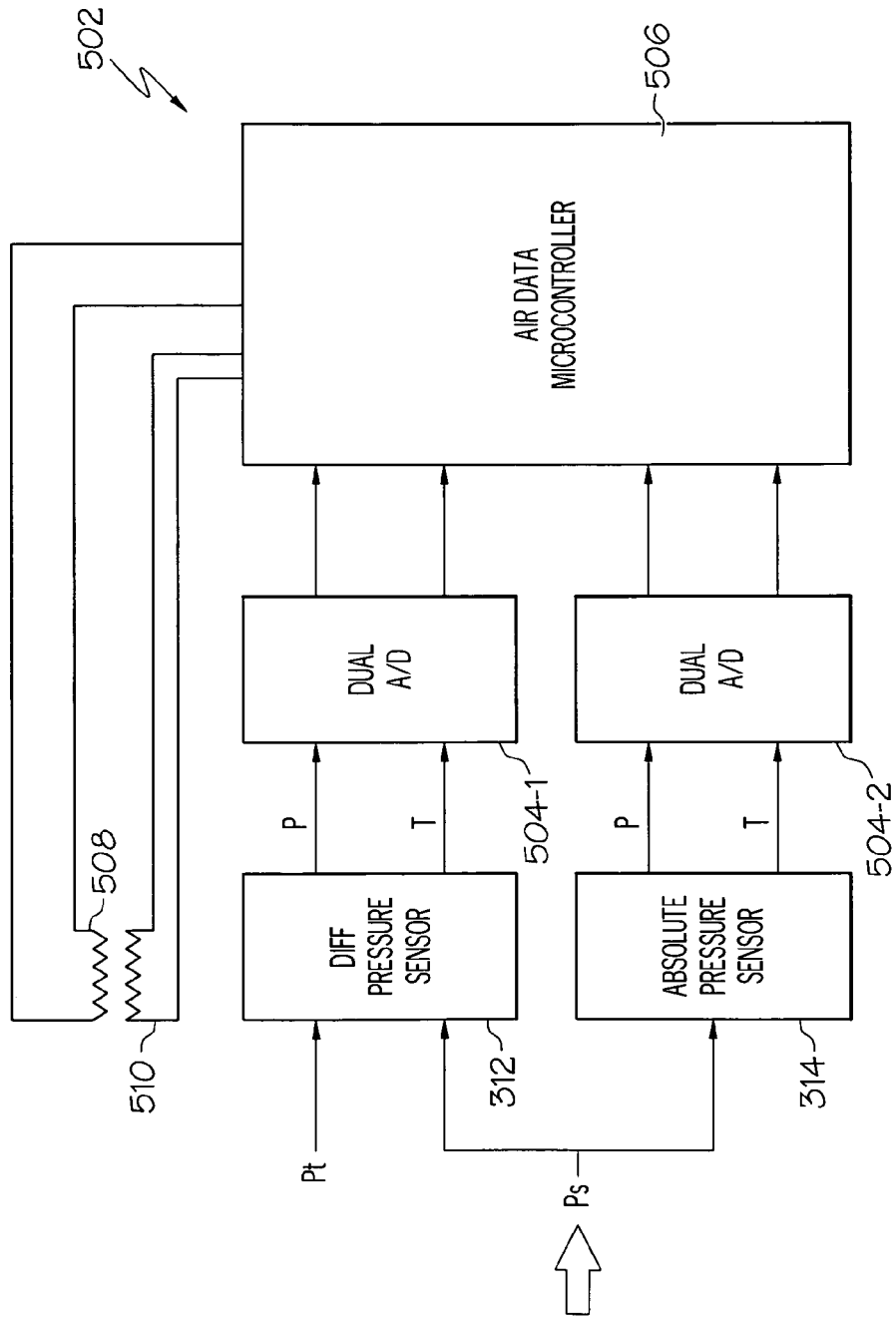
FIG. 5 is a functional block diagram depicting exemplary pressure sensors and processing circuitry that may be mounted within the integrated air data module of FIGS. 2-4.
Figure 6:
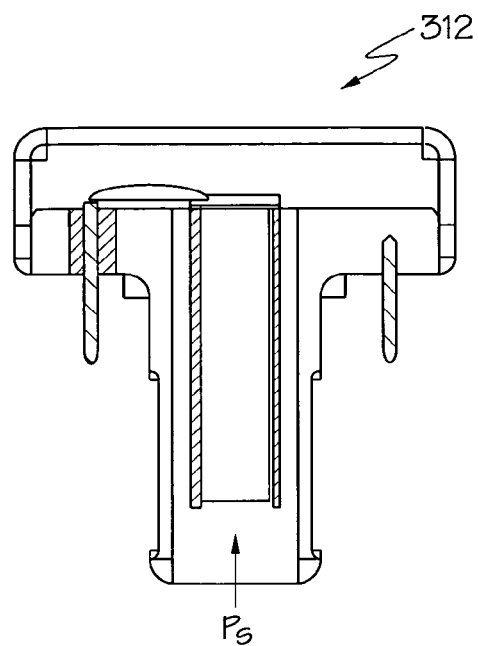
FIGS. 6 and 7 are cross section views of exemplary static and differential pressure sensors, respectively, that may be mounted within the integrated air data module of FIGS. 2-4.
Figure 7:
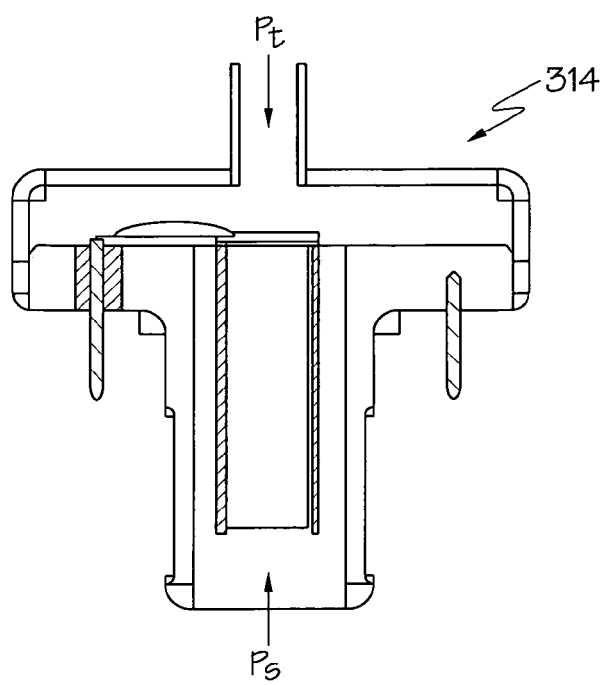

Turning now to FIG. 5, the pressure sensors 312, 314 and the circuitry 502, which may be disposed within the sensors 312, 314, on the circuit board 308, or both, are depicted in block diagram form. The absolute pressure sensor 312, an exemplary embodiment of which is depicted in FIG. 6, is configured to sense static pressure (Ps) within the sensor compartment 302. As was noted above, the sensor compartment 302 is in fluid communication with the static pressure flow passage 322 in the pitot-static probe 204. Thus, the absolute pressure sensor 312, via the static pressure ports 218 and the static pressure flow passage 322, senses the static pressure (Ps) of the ambient environment surrounding the pitot-static probe 204. The differential pressure sensor 314, an exemplary embodiment of which is depicted in FIG. 7, is configured to sense impact pressure (Qc), which is the differential pressure between the static pressure (Ps) in the sensor compartment 302 and the total pressure (Pt) (e.g., Qc=Pt−Ps). More specifically, as was noted above, the differential pressure sensor 314 is in fluid communication, via the pitot pressure conduit 330, with the pitot pressure inlet port 324, which supplies the total pressure (Pt) input to the differential pressure sensor 314. The differential pressure sensor 314 is additionally in fluid communication with the sensor compartment 302, which supplies the static pressure (Ps) input to the differential pressure sensor 314.

Although the pressure sensors 312, 314 may be implemented using any one of numerous types and configurations of known pressure sensors, each is preferably implemented as a solid state pressure sensor that preferably includes not only a device for sensing pressure, such as a pressure-sensing Wheatstone bridge on a solid state diaphragm, but a temperature sensor as well. The temperature sensor is preferably used by the processing circuitry 502 to compensate for temperature effects on the pressure measurement. It will additionally be appreciated that the air data module could alternatively be implemented using any one of numerous known integral air data modules. An integral air data module is typically implemented with a smart pressure transducer that integrates the processing circuitry 502 with a solid state pressure sensor 312, 314, such as those depicted in FIGS. 6 and 7.

The processing circuitry 502 that is used may additionally vary, but in the depicted embodiment, it includes appropriate analog-to-digital (A/D) conversion circuits 504 (e.g., 504-1, 504-2) and a microcontroller 506 to perform the pressure and temperature computations, and to compute respective static source and air data parameters, if desired, based on the computed pressures. One or more of these circuits may be integrated into a microcomputer or the pressure sensors 312, 314 or implemented on the circuit board 308. In either case, the A/D conversion circuits 504 convert the analog pressure and temperature signals supplied from each sensor 312, 314 to digital signals, and supplies these digital signals to the air data microcontroller 506. The air data microcontroller 506 in turn, using known algorithmic techniques, corrects the pressure signals for pressure sensor offset, non-linearities, and thermal effects over the calibrated operating pressure and temperature. The air data microcontroller then supplies signals representative of computed static pressure (Ps) and impact pressure (Qc) or total pressure (Pt), and/or computes various flight-related air data parameters such as altitude, airspeed, and mach (M), and supplies signals representative of these parameters, via the I/O connector 315 and I/O interface 317, to the missile 104. The specific flight-related parameters may vary, but preferably include at least Mach (M), computed air speed (Vc), and pressure altitude (Hp). As is generally known, these quantities may be computed using the following formulae, based on sensed static pressure (Ps) and impact pressure (Qc):

$$M = 2.236068\left[\left(\frac{Qc}{Ps}+1\right)^{0.2857142}-1\right]^{0.5} \text{ for } M \leq 1.0,$$

$$Vc = 661.4786\left[5\left\{\left(\frac{Qc}{Po}+1\right)^{\frac{2}{7}}-1\right\}\right]^{0.5}, \text{ and}$$

$$Hp = \frac{1-\left(\frac{Ps}{Po}\right)^{0.190255}}{6.875586\times 10^{-6}} \text{ for } Hp \leq 36 \text{ K ft}; \quad Po = 29.92126 \text{ in Hg}$$

$$Hp = -20805.85\times \ln\left(\frac{Ps}{6.68322}\right)+36089.23; \text{ for } 36 \text{ K ft} < Hp \leq 65.6 \text{ K ft}$$

$$Hp = 65616.7979+710793.9632\left[\left(\frac{Ps}{1.61673394}\right)^{-.0292712672}-1\right];$$
$$\text{for } 65616.79 \text{ ft} < Hp \leq 104986.87 \text{ ft.}$$

In addition to the above, the air data module 200 may further include one or more sets of heaters. For example, in the embodiment depicted in FIG. 5, the air data module further includes one or more boost heaters 508 and a probe heater 510. The boost heaters 508 are selectively energized to raise the temperature of the sensors 312, 314 to their optimum operating range, and the probe heater 510 is used to minimize ice accretion. Moreover, and though, for clarity, not depicted, various desiccant and/or filter media may be disposed in the sensor chamber 302 to prevent, or at least inhibit, particulates and/or moisture from adversely affecting the sensors 312, 314.

The air data module 200 configuration described herein, in which a differential pressure sensor 314 is used, is particularly advantageous if the pressure sensors 312, 314 are momentarily exposed to a relatively high-magnitude pressure pulse, such as previously described. This is because the pressure pulse is applied to the differential pressure sensor 314 as a common mode pressure (i.e. it occurs on each side of the sensor chip at the same time), and therefore exposes the differential sensor 314 to essentially zero over-pressure. Thus, the differential pressure sensor is not adversely affected by the common-mode pressure pulse, and need not be derated. It will be appreciated that the static pressure sensor 312 will nonetheless be exposed to the pressure pulse, and will therefore be derated accordingly.

Because the differential sensor 314 is adversely affected by the common-mode pressure pulse, it can be designed for a full scale pressure range that is determined by the flight profile of the aircraft 104. The maximum differential pressure magnitude that the differential pressure sensor 314 will experience will be at a relatively high Mach (M) and relatively low altitudes. For example, at sea-level pressure altitude and Mach 1, total pressure (Pt) will be about 27.8 p.s.i.a., and static pressure (Ps) will be about 14.7 p.s.i.a. The differential sensor pressure range would then only need to be the difference between these two pressures (e.g., 27.8–14.7 psia=13.1 p.s.i.a.). Since the differential pressure sensor 314 does not need to be derated, the closest available range above 13.1 p.s.i.a. is acceptable. As a result, a relatively low cost 15 p.s.i.d., 0.1% accurate differential pressure sensor 314 can be used. This particular differential pressure sensor 314 would provide an accuracy of ±0.015 p.s.i.a. For a configuration in which impact pressure (Qc) is determined from static and total absolute pressure sensors, each having accuracies of 0.025% and 0.05% of 30 p.s.i.a., respectively, the net impact pressure (Qc) measurement accuracy would only be about ±0.0225 p.s.i.d., with correspondingly degraded air data measurement performance.

Figure 8:
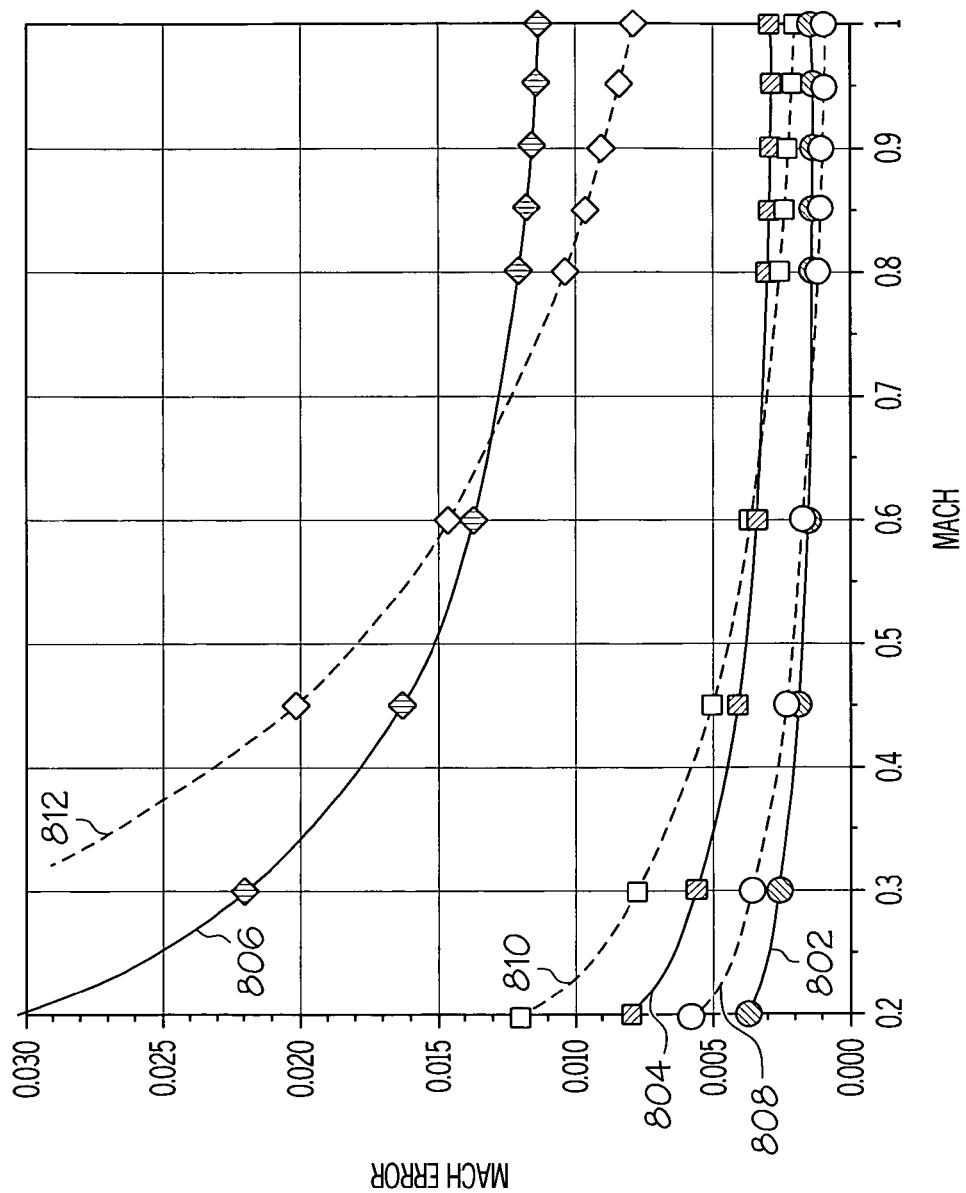
FIGS. 8 and 9 graphically depict the Mach and calculated airspeed accuracies, respectively, obtained when using a differential sensor and an absolute sensor versus the conventional use of absolute sensors.
Figure 9:
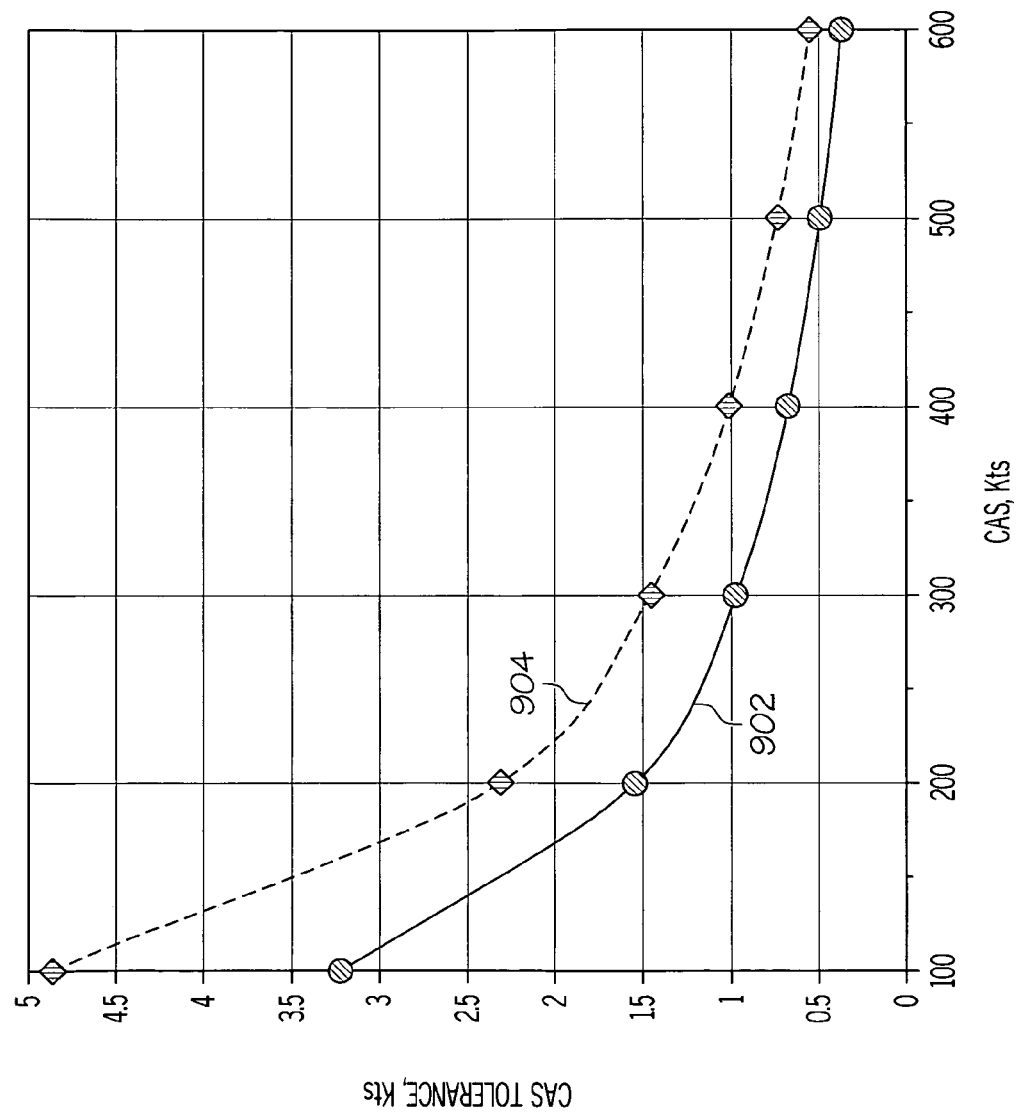

For completeness, FIGS. 8 and 9 are included herewith and depict the accuracy obtained when using a differential sensor and an absolute sensor versus the conventional use of absolute sensors. In particular, FIG. 8 depicts the Mach accuracy achieved at sea level 802, at 20,000 feet 804, and at 50,000 feat 806, when a 0.1%, 15, p.s.i.d. differential pressure sensor and a 0.1%, 30 p.s.i.a. sensor are used, versus the accuracy achieved at sea level 808, at 20,000 feet 812, and at 50,000 feet 814, when absolute sensors adjusted to withstand a 60 p.s.i.a. pressure pulse are used. Similarly, FIG. 9 depicts the computed airspeed accuracy achieved when a 0.1%, 15, p.s.i.d. differential pressure sensor and a 0.1%, 30 p.s.i.a. sensor are used 902, versus the accuracy achieved when absolute sensors adjusted to withstand a 60 p.s.i.a. pressure pulse are used 904. Although the accuracy of the individual sensors used to measure impact pressure and static pressure, when expressed as a percentage of full scale range (f.s.r.), are not as good as those used to measure total pressure and static pressure, the net accuracies of Mach and computed airspeed are about equal overall. Moreover, net accuracy is superior in the low Mach number range, because sensor derating is not necessary for impact pressure measurement. Thus, the measurement of Mach is desensitized to static pressure errors by employing the differential pressure and static pressure measurement approach described herein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An integrated air data module, comprising:
   a housing adapted to be mounted to an external surface of an aircraft, and including at least a sensor compartment and an interface electronics compartment formed therein, the sensor compartment isolated from the interface electronics compartment;
   a pitot-static probe coupled to the housing and extending therefrom, the pitot-static probe having at least an inner surface, an outer surface, and a distal end spaced apart from the housing, the inner surface defining a static pressure passageway that is in fluid communication with the sensor compartment
   a plurality of static pressure ports extending between the pitot-static probe inner and outer surfaces, and in fluid communication with the static pressure passageway;
   a pitot pressure inlet port in the pitot-static probe distal end.

2. The module of claim 1, further comprising:
   a pitot pressure conduit disposed at least partially within, and at least partially surrounded by, the pitot-static probe static pressure passageway, the pitot pressure conduit having a passageway formed therein that fluidly couples the pitot pressure inlet port to the sensor compartment.

3. The module of claim 1, wherein:
   the housing further includes an upstream end and a downstream end; and
   the pitot-static probe extends from the housing at least proximate the housing upstream end and at a predetermined angle relative to the surface on which the housing is adapted to mount.

4. The module of claim 3, wherein:
   the surface on which the module is adapted to mount is configured to be disposed over a range of angles of attack when the aircraft is in flight; and
   the predetermined angle is at least substantially equal to the mean of the range of angles of attack range.

5. The module of claim 3, wherein:
   the surface on which the module is adapted to mount is configured to be disposed over a range of angles of attack when the aircraft is in flight; and
   the predetermined angle is at least substantially equal to the median of the range of angles of attack range.

6. The module of claim 1, further comprising:
   an absolute pressure sensor mounted within the housing sensor compartment and configured to sense static pressure in the housing sensor compartment; and
   a differential pressure sensor mounted within the housing sensor compartment and configured to sense a differential pressure between the static pressure in the housing sensor compartment and total pressure in the pitot pressure passageway.

7. The module of claim 6, further comprising:
   a circuit extending between the sensor compartment and the interface electronics compartment and electrically coupled to both the absolute pressure sensor and the differential pressure sensor.

8. The module of claim 7, wherein the circuit is configured to determine at least one or more of static pressure ($P_s$), impact pressure ($Q_c$), total pressure ($P_t$), mach number, calibrated airspeed, and altitude based at least in part on the sensed static pressure and the sensed differential pressure.

9. The module of claim 6, further comprising:
   an input/output (I/O) connector extending through the housing and into the interface electronics compartment, the I/O connector coupled to the circuit and configured to electrically couple the circuit to a data interface external to the housing.

10. The module of claim 1, wherein the pitot pressure conduit comprises a substantially flexible tube.

11. The module of claim 1, wherein the housing is constructed at least partially of a polymer material.

12. The module of claim 1, wherein the housing is at least partially plated with a material that provides electromagnetic shielding.

13. The module of claim 1, wherein the pitot pressure inlet port has a cross section flow area that converges from a first cross sectional flow area to a second cross section flow area.

14. The module of claim 1, wherein:
when the module is mounted on the external surface of the aircraft, the pitot-static probe has at least a top side, a bottom side, a left side, and a right side; and
each static pressure port is located on the pitot-static probe right side, the pitot-static probe left side, or both.

15. An integrated air data module, comprising:
a housing adapted to be mounted to an external surface of an aircraft, and including at least a sensor compartment and an interface electronics compartment formed therein, the sensor compartment isolated from the interface electronics compartment;
a pitot-static probe coupled to the housing and extending therefrom, the pitot-static probe having at least an inner surface, an outer surface, and a distal end spaced apart from the housing, the inner surface defining a static pressure passageway that is in fluid communication with the sensor compartment;
a plurality of static pressure ports extending between the pitot-static probe inner and outer surfaces, and in fluid communication with the static pressure passageway;
a pitot pressure inlet port in the pitot-static probe distal end;
an absolute pressure sensor mounted within the housing sensor compartment, the absolute pressure sensor in fluid communication with the housing sensor compartment and configured to sense static pressure therein; and
a differential pressure sensor in fluid communication with the static pressure passageway and the pitot pressure inlet port and configured to sense a differential pressure there-between.

16. The module of claim 15, wherein the differential pressure sensor is mounted within the sensor compartment, and wherein the module further comprises:
a pitot pressure conduit disposed at least partially within, and at least partially surrounded by, the pitot-static probe static pressure passageway, the pitot pressure conduit having a passageway formed therein that fluidly couples the pitot pressure inlet port to the differential pressure sensor.

17. The module of claim 15, wherein the differential pressure sensor is mounted within the pitot pressure inlet.

18. The module of claim 15, wherein:
the aircraft on which the housing is configured to mount is designed for a predetermined flight profile;
the absolute and differential pressure sensors are each exposed to a predetermined overpressure magnitude prior to the aircraft commencing flight;
the absolute pressure sensor is designed for a full scale pressure range that is based on the predetermined overpressure magnitude; and
the differential pressure sensor is designed for a full scale differential pressure range that is based on the predetermined flight profile of the aircraft and is not based on the predetermined overpressure magnitude.

19. The module of claim 15, wherein:
the housing further includes an upstream end and a downstream end; and
the pitot-static probe extends from the housing at least proximate the housing upstream end and at a predetermined angle relative to the surface on which the housing is adapted to mount;
the surface on which the module is adapted to mount is configured to be disposed over a range of angles of attack when the aircraft is in flight; and
the predetermined angle is at least substantially equal to the mean of the range of angles of attack range.

20. The module of claim 15, wherein:
the housing further includes an upstream end and a downstream end; and
the pitot-static probe extends from the housing at least proximate the housing upstream end and at a predetermined angle relative to the surface on which the housing is adapted to mount;
the surface on which the module is adapted to mount is configured to be disposed over a range of angles of attack when the aircraft is in flight; and
the predetermined angle is at least substantially equal to the median of expected angle of attack range.

21. The module of claim 15, further comprising:
a circuit extending between the sensor compartment and the interface electronics compartment and electrically coupled to both the absolute pressure sensor and the differential pressure sensor, the circuit configured to determine at least mach number, calibrated airspeed, and altitude based at least in part on the sensed static pressure and the sensed differential pressure; and
an input/output (I/O) connector extending through the housing and into the interface electronics compartment, the I/O connector coupled to the circuit and configured to electrically couple the circuit to a data interface external to the housing.

22. The module of claim 15, wherein the pitot pressure inlet port has a cross section flow area that converges from a first cross sectional flow area to a second cross section flow area.

23. A method of providing air data sensor performance from pressure sensors used with an aircraft having a predetermined flight profile, and following exposure of the sensors to a predetermined overpressure magnitude, the method comprising the steps of:
using an absolute pressure sensor to sense static pressure at a position on the aircraft, the absolute pressure sensor being designed for a full scale pressure range that is based on the predetermined overpressure magnitude;
using a differential pressure sensor to sense impact pressure at the position on the aircraft by sensing a differential pressure between total pressure and static pressure at the position on the aircraft, the differential pressure sensor being designed for a full scale pressure range that is based on the predetermined flight profile of the aircraft and is not based on the predetermined overpressure magnitude; and
determining one or more air data parameters based at least in part on the sensed static pressure and the sensed impact pressure.

* * * * *